United States Patent [19]

Sehgal et al.

[11] Patent Number: 5,102,833

[45] Date of Patent: Apr. 7, 1992

[54] STRENGTHENING GLASS ARTICLES WITH ELECTROMAGNETIC RADIATION AND RESULTING PRODUCT

[75] Inventors: Jeetendra Sehgal; Lenwood D. Pye, both of Alfred, N.Y.

[73] Assignee: Alfred University, Alfred, N.Y.

[21] Appl. No.: 727,883

[22] Filed: Jul. 10, 1991

[51] Int. Cl.$^5$ .............................................. C03C 10/12
[52] U.S. Cl. ................................... 501/4; 65/30.11; 65/33; 501/6; 501/8
[58] Field of Search .................. 501/4, 6, 8; 65/30.11, 65/33

[56] References Cited

U.S. PATENT DOCUMENTS

| | | |
|---|---|---|
| 2,515,275 | 7/1950 | Stookey . |
| 2,515,937 | 7/1950 | Stookey . |
| 2,515,940 | 7/1950 | Stookey . |
| 2,515,941 | 7/1950 | Stookey . |
| 2,515,942 | 7/1950 | Stookey . |
| 2,515,943 | 7/1950 | Stookey . |
| 2,971,853 | 2/1961 | Stookey . |
| 3,445,209 | 5/1969 | Asunmaa ................................ 65/33 |
| 3,451,796 | 6/1969 | Mochel .................................. 65/31 |
| 3,490,984 | 1/1970 | Petticrew et al. ..................... 65/33 |
| 3,697,242 | 10/1972 | Shonebarger .......................... 65/30 |
| 3,743,491 | 7/1973 | Poole et al. ............................ 65/33 |
| 3,998,617 | 12/1976 | Gliemeroth ............................ 65/33 |
| 4,218,512 | 8/1980 | Allersma .............................. 65/33 X |
| 4,328,299 | 5/1982 | Beall et al. ..................... 65/30.11 X |
| 4,336,303 | 6/1982 | Rittler ................................ 65/33 X |
| 4,341,543 | 7/1982 | Andrus et al. ....................... 65/30.1 |
| 4,872,896 | 10/1989 | LaCourse et al. ................. 65/30.14 |

FOREIGN PATENT DOCUMENTS 635649 4/1950 United Kingdom .
752243 7/1956 United Kingdom .

OTHER PUBLICATIONS

S. D. Stookey, "Coloration of Glass by Gold, Silver, and Copper," *J. American Ceramic Society* vol. 32, No. 8 (1949).

R. J. Futato and R. H. Doremus, "Nucleation in Photosensitive Gold Ruby Glass," *J American Ceramic Society*, vol. 63, Nos. 3-4 (1979).

J. D. Stookey, "Chemical Machining of Photosensitive Glass," *Industrial and Engineering Chemistry*, vol. 45, No. 1, pp. 115-118 (1953).

*Primary Examiner*—Robert L. Lindsay
*Attorney, Agent, or Firm*—Michael L. Goldman

[57] ABSTRACT

Alkali metal- and alkaline earth metal-oxide aluminosilicate amorphous glass articles can be strengthened by providing such glass with a cerium dioxide sensitizer and a nucleating agent, irradiating the article with electromagnetic radiation, heating the irradiated article to a temperature between about the annealing and softening points of the glass, and cooling the heated, irradiated glass article. The treated article has a thick lower layer of the amorphous glass, but a thin layer of this glass at the surface of the article has been converted to a crystalline state. In this surface layer, some of the cerium has been converted from a +3 to a +4 ionic state and some of the metal element in the nucleating agent has been changed to a metallic state. The adjacent location of the lower and surface layers creates large compressive stresses at the surface layer which imparts great strength to the glass article.

23 Claims, No Drawings

STRENGTHENING GLASS ARTICLES WITH ELECTROMAGNETIC RADIATION AND RESULTING PRODUCT

FIELD OF THE INVENTION

The present invention relates to strengthening alkali metal- or alkaline earth metal-oxide aluminosilicate glass articles.

BACKGROUND OF THE INVENTION

Various methods have been utilized to strengthen glass articles without the addition of coatings or laminates. Generally, these techniques involve promoting an increase in glass strength by altering the surface of the glass articles to be strengthened. This is usually achieved by creating compression in only the surface of glass articles which results in the development of tensile stresses. Strengthening is achieved, because such surface compressive forces must be overcome to fracture the glass.

One conventional method of strengthening glass is tempering, where a glass article is heated and then quickly chilled so that the outside portion of the article is cooled and shrinks before the interior. As the interior cools and shrinks, the surface zone is placed in compression. See U.S. Pat. No. 3,490,984 to Petticrew et al.

Another known glass strengthening method involves the substitution or exchange of smaller ions of an alkali metal from an external source for larger ions of a different alkali metal at the surface of the glass. It has also been suggested, in U.S. Pat. No. 3,356,477, that sodium ions can be replaced with ionized potassium salts. As in tempering, compression is developed at the surface of the article. However, ion exchange achieves such compression by changing the surface composition of the glass from that of the interior.

Variations of the ion exchange strengthening technique are disclosed by U.S. Pat. No. 3,743,491 to Poole et al., which sprays glass bodies with tannic chloride or titanium or zirconium compounds prior to ion exchange of sodium with potassium, and U.S. Pat. No. 4,872,896 to LaCourse et al., which effects ion exchange in conjunction with the application of microwave radiation.

All such ion exchange processes—whether ions in the glass surface are replaced by smaller ions or by larger ions—require the ions in the glass surface to be exchangeable. Soda-lime glasses contain replaceable sodium ions and, therefore, are commonly strengthened by ion exchange. In general, however, such processes have limited utility, because they do not greatly strengthen glass which lacks exchangeable sodium ions.

To overcome this problem, U.S. Pat. No. 3,697,242 to Shonebarger strengthens glass by crowding lithium and/or potassium ions into the surface of glass without counterbalancing ion removal. Such addition causes ions of the added compounds to migrate into the surface of the glass and establish a compression zone that strengthens the glass.

Yet another glass strengthening process involves contacting glass articles with gaseous sulfur dioxide, as disclosed by U.S. Pat. Nos. 3,451,796 to Mochel and 4,341,543 to Andrus et al. Such an approach, however, requires separate handling and treatment systems to permit utilization of such poisonous, corrosive gases.

One problem with all processes of strengthening glass by compression is the inability to control surface layer thickness. Generally, the compressed surface layer can have a thickness ranging up to a few millimeters which severely limits the size of articles that can be strengthened. Thus, thin glass sheets, glass fibers, and other articles with small dimensions cannot be strengthened, because the depth of the induced surface compressive layer may exceed the dimensions of the glass article. This has severely limited the size of articles which can be strengthened. In addition, such control problems limit the usefulness of surface compression techniques in treating articles with different regions of varying thickness, because uniform strengthening is particularly difficult to achieve in different regions.

A concurrent development in the glass industry has been the photonucleation and crystallization of aluminosilicate glass articles with electromagnetic radiation. Upon heat treatment between the glass's annealing point (i.e., the temperature which, if held a short time, usually about 1 hour, causes most of the stresses in the glass to be relaxed) and its softening point (i.e., the temperature at which the glass starts to flow at a viscosity of about $1 \times 10^{+7.6}$ poise), crystallization occurs in exposed areas. The aluminosilicate glass treated according to this procedure also contains alkali metal- or alkaline earth metal-oxides, usually lithium oxide, together with a cerium dioxide optical sensitizer and a nucleating agent, such as a salt of gold, silver, copper, and palladium with gold and/or silver.

Upon exposure of the glass to ultraviolet radiation, $Ce^{+3}$, formed when the initially-present cerium dioxide undergoes thermoreduction to $Ce_2O_3$ during melting of the glass, is converted to $Ce^{+4}$ and liberates an electron according to the following reaction:

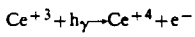

The liberated electron diffuses to nearby silver ions where it reacts as follows:

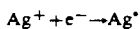

Subsequent heat treatment causes agglomeration of $Ag°$ atoms which forms Ag colloids dispersed throughout the glass. These colloids act as nucleating sites for crystal growth during heating at temperatures between the annealing and softening points of the glass. Specifically, in lithium aluminosilicate glass, such heat treatment causes lithium metasilicate or other crystalline phases to form on the silver colloids. If gold, copper, or palladium with gold and/or silver are used instead of silver, they function similarly. Crystallization occurs only in the areas exposed with ultraviolet radiation. The crystallized glass is then cooled slowly.

The use of this process to produce colored glass is disclosed in U.S. Pat. Nos. 2,515,275, 2,515,937, 2,515,940 ("Stookey '940"), 2,515,941 ("Stookey '941"), 2,515,942, 2,515,943 ("Stookey '943"), and 2,971,853 ("Stookey '853") all to Stookey and British Patent Nos. 635,649 and 752,243 ("Stookey '243") to Stookey. See also S. D. Stookey, "Coloration of Glass by Gold, Silver, and Copper," *J. American Ceramic Society*, Vol. 32, No. 8 (1949) and R. J. Futato and R. H. Doremus, "Nucleation in Photosensitive Gold Ruby Glass," *J. American Ceramic Society*, Vol. 63, Nos. 3–4 (1979). As shown in Stookey '943, such coloration takes place throughout the bulk of the glass where it has been exposed. In Stookey '940 and Stookey '941, it is recognized that coloration occurs when such glass is exposed due to the formation of some alkali metal disilicate crystals throughout or at least substantially into the bulk of the exposed glass. In Stookey '243 and Stookey '853, lithium aluminosilicate glasses are treated, and it is suggested that β-spodumene crystals are produced in addition to lithium metasilicate crystals. However, these crystals are present as a crystalline solution of β-spodumene and quartz.

U.S Pat. No. 3,445,209 to Asunmaa also discloses the formation of crystals in glass by exposure with radiation.

It has also been known to chemically machine glass which has been treated with ultraviolet radiation, heated, and cooled. This is achieved by treating the cooled glass with a 5% HF solution to remove, by dissolution, the low chemical durability lithium metasilicate phase present through the bulk of the glass in exposed areas. As a result, a solid glass with various desired patterns remain. See Stookey '243 and J. D. Stookey, "Chemical Machining of Photosensitive Glass," *Industrial and Engineering Chemistry*, Vol. 45, No. 1, pp. 115-118 (1953).

SUMMARY OF THE INVENTION

The present invention relates to a process of strengthening a glass article with electromagnetic radiation. The process involves providing an article formed from a glass including silicon dioxide, aluminum oxide, an alkali metal- or alkaline earth metal-oxide, cerium dioxide, and a nucleating agent in the form of a salt of a metal selected from the group consisting of gold, silver, copper, palladium with gold and/or silver, and mixtures thereof. The article is irradiated with electromagnetic radiation, heated to a temperature between the annealing and softening points of the glass, and then cooled.

By use of this process, a strengthened, glass-containing article is formed with a thick amorphous lower layer and an adjacent thin, crystalline surface layer. The thick lower layer has the same composition and amorphous structure as the glass had throughout the article before it was treated by the process of the present invention. However, at the surface of the article, that amorphous glass has been transformed to a substantially crystalline form of the glass containing cerium in a +4 ionic state and some of the gold, silver, copper, or palladium with gold and/or silver in a metallic state. The lower and surface layers have a bulk cross-sectional area ratio which creates large compressive stresses at the surface layer to strengthen the article.

The same surface compression effect is achieved by the process of the present invention as that found in the products of prior art compression strengthening processes. However, the process of the present invention is able to control the depth of surface compression accurately by careful selection of cerium dioxide content, glass composition, irradiation wavelength and intensity, and heat treatment time and temperature. The ability to achieve such control makes this process suitable for strengthening glass of varying thickness even if such variation is in a single glass article. Moreover, when treating an article having regions of differing thickness, uniform strengthening is achieved. The glass strengthening process of the present invention thus constitutes a significant advance over prior art strengthening techniques.

DETAILED DESCRIPTION OF THE INVENTION

The process of the present invention relates to strengthening glass articles with electromagnetic radiation. Such articles are formed from an amorphous glass containing silicon dioxide, aluminum oxide, an alkali metal- or alkaline earth metal-oxide, cerium dioxide, and a nucleating agent in the form of a salt of a metal selected from the group consisting of gold, silver, copper, palladium with gold and/or silver, and mixtures thereof. The article is irradiated with electromagnetic radiation to oxidize the cerium in the +3 oxidation state to a +4 oxidation state and to reduce the ionic metals in the nucleating agent to a metallic state at the surface of the glass. The irradiated article is then heated to a temperature between the annealing and softening points of the glass to form a crystalline surface layer and a thicker lower layer containing the amorphous glass which the article initially consisted of. The heated, irradiated article is then cooled to establish surface compression which strengthens the glass.

As in prior art glass coloration procedures, irradiation converts cerium in the glass from a +3 oxidation state to a +4 state with each ion of cerium dioxide producing an electron. This electron, in turn, converts the metal element in the nucleating agent from a +1 ionic state to a metallic state. Although the type of electromagnetic radiation which can be utilized in the process of the present invention varies widely from ultraviolet radiation to with high energy x-rays, it is particularly preferred to utilize ultraviolet radiation. Suitable wavelengths of ultraviolet radiation are 254 to 365 nanometers, while the irradiation period can last from 1 to 30 minutes depending on the intensity of radiation utilized. The intensity of the radiation being utilized ranges from 1,000 to 10,000 microwatts per square centimeter of exposed surface of the irradiated article. Since cerium has a high absorbance in the ultraviolet region of the electromagnetic spectrum, this low level of radiation is in part responsible for the formation of a thin crystalline surface layer and a thick amorphous lower layer during the subsequent heating step of the process. This is much different from the prior art glass coloration procedures which form crystals throughout the bulk of the treated article by use of ultraviolet radiation of high intensity.

Heat treatment at temperatures between the annealing and softening points of the glass causes crystallization to occur around the metal element from the nucleating agent which is now in a metallic oxidation state. Specifically, these metals agglomerate to form metallic colloids which act as nucleating sites for crystal growth during heating. The annealing and softening points of a glass are highly dependent upon the constituents of the glass. As a result, the actual numerical temperature values utilized will vary widely depending upon the type of glass the article is made from. Likewise, heating times are also wide ranging, depending upon the thickness of the article. One suitable heat treatment involves holding the irradiated article at a temperature of 10° to 50° C. above the annealing point of the glass for 10 minutes to one hour, preferably 30 minutes, for nucleation and then heat treating the exposed glass for 10 minutes to one hour, preferably 20 minutes, at 70° to 170° C. above the glass annealing point for crystallization. Careful selection of heating times and temperatures will ensure formation of a product with a thin crystalline surface layer and a thick amorphous lower layer. This selection is normally made by knowing the cerium dioxide content, as well as the wavelength and intensity of the radiation. In commercial operations, the irradiation and heating steps are carried out consecutively.

The cooling step creates surface compression in the article. As discussed above, this achieves strengthening by creating a high level of stress within the glass which must be overcome before the glass will break. During cooling, the temperature of the glass is reduced to a final temperature of about 25° C. (i.e. room temperature). Cooling rates of $-1$ to $-2°$ C. per minute are suitable.

The glass which can be treated in accordance with the procedure of the present invention contains 55 to 85 weight percent (preferably 66 weight percent) silicon dioxide, 3 to 30 weight percent (preferably 21 weight percent) aluminum oxide, and 5 to 25 weight percent (preferably 13 weight percent) alkali metal- or alkaline earth metal-oxide. The cerium dioxide is also included as a radiation sensitizer in an amount of 0.03 to 1 weight percent, preferably 0.05 weight percent. In such low amounts, surface crystallization, rather than crystallization throughout the bulk of the article, is achieved. Suitable nucleating agents are salts of gold, silver, copper, palladium with gold and/or silver, and mixtures thereof. Any gold salt is present in an amount of up to 0.5 weight percent, while any silver is utilized in an amount of up to 0.1 weight percent, any copper is utilized at a level of up to 1.0 weight percent, and palladium (used with gold and/or silver) can be used in an amount of up to 0.02 weight percent. Judicious selection of glass components will help form a thin crystalline surface layer and an adjacent thicker amorphous lower layer when the glass is treated with the process of the present invention. The thickness of the thin crystalline surface layer depends basically on amount of $CeO_2$ used, the intensity and wavelength of radiation employed, and the heat treatment time and temperature. Specifically, the crystalline surface layer thickness is proportional to radiation intensity, radiation wavelength, heating time, and heating temperature and inversely proportional to the concentration of cerium dioxide.

The ratio of the surface layer bulk cross-sectional area to the lower layer bulk cross-sectional area is up to 0.30:1.0. If this ratio is greater than 0.30:1.0, the surface compressive stresses developed are extremely high, and the resulting tensile stresses cause the glass to fail catastrophically.

Optional materials may be added to the glass of the present invention, usually to lower the melting point of the glass. These optional materials are mainly alkali metal and alkaline earth metal oxides (other than lithium) which are used in very small amounts compared to lithium.

Glass for treatment in accordance with the claimed invention can be prepared by a variety of techniques. One preparation process involves dispersion of cerium dioxide and the metal salt nucleating agent(s) in distilled water at room temperature. The major glass constituents can then be added to the dispersion in the form of salts of alkali metals or alkaline earth metals as well as silicon and aluminum compounds, such as oxides, hydroxides, and alkoxides of these elements. Any optional materials can also be added at this time. The resulting slurry is then dried to a moisture content of 10-30 weight percent (preferably 20 weight percent) by heating to 80°-110° C., preferably 100° C. The dried material is then transferred to a crucible and heated to form a glass melt with a viscosity of 0.01-1000 poise, preferably 100 poise. One suitable heating schedule involves holding the material at 1000° C. for 15 minutes and then heating at 1500° to 1700° C. for 6 hours. The glass melt can then be shaped as desired.

Once the article made from such a glass is treated by the process of the present invention, a thick amorphous lower layer of this glass remains. However, at the surface of the article, the original amorphous glass has been converted to a thin crystalline surface layer. In this surface layer, some of the cerium is in a $+4$ ionic state and some of the gold, silver, copper, or palladium with gold and/or silver is in a metallic state.

In a particularly preferred embodiment of the present invention, the glass is a lithium aluminosilicate glass, and the thin, crystalline surface layer is substantially pure $\beta$-spodumene. In such glass, the lithium oxide to aluminum oxide molar ratio is preferably 1:1, while the silicon dioxide content should be greater than 67 mole percent. Other useful glasses are barium aluminosilicate glasses in which the thin crystalline surface layer is substantially pure celsian and magnesium aluminosilicate glass in which the thin crystalline surface layer is substantially pure corderite.

EXAMPLES

Example 1

A mixture consisting of 0.02 parts of silver nitrate and 0.03 parts of cerium dioxide in 100 ml of distilled water was stirred until all of the cerium dioxide dispersed completely. 68.0 parts of $SiO_2$, 25.0 parts of $Al_2O_3$, and 7.0 parts of $Li_2O$ as lithium carbonate were then mixed with the slurry containing silver nitrate and cerium dioxide. The mixture was heated at about 100° C., while stirring, until it was dried to a quasi-solid state. The dried material was then melted at 1700° C. for 4 hours. The melt, having a glass transition temperature of 736° C. was poured on a steel plate to form a 0.5 cm thick sheet. The glass was then exposed to ultraviolet radiation at an intensity of 5600 microwatts per $cm^2$ for 20 minutes at a wavelength of 254 nm. After exposure, the glass was heat treated at 790° C. for 30 minutes and then at 900° C. for 60 minutes to cause crystallization on the surface of the glass. To determine the crystal form of the surface layer, the above process was repeated except the glass melt was instead poured to a thickness of only 0.75 mm. With such a thin sheet, repetition of the above exposure and heating steps formed a crystal phase throughout the thickness of the sheet. These samples were crushed and ground using a mortar and a pestle. X-ray diffraction was performed on the ground glass which showed that the crystalline surface layer was $\beta$-spodumene.

Example 2

0.05 parts of gold in the form $HAuCl_4 3H_2O$ and 0.05 parts of cerium dioxide in 100 ml of distilled water were stirred until all of the cerium dioxide was completely dispersed. At this stage, 65.9 parts of $SiO_2$, 20.7 parts of $Al_2O_3$ as aluminum hydroxide, 6.1 parts of $Li_2O$ as lithium carbonate, 2.9 parts of $K_2O$ as potassium carbonate, 2.0 parts of $Na_2O$ as sodium carbonate, 1.1 parts of $CaO$ as calcium carbonate, and 1.2 parts of $MgO$ as magnesium carbonate were mixed in the water containing gold and cerium dioxide. The mixture was then heated at about 100° C., while stirring, to dry it to a quasi-solid state. After the mixture was melted at 1500° C. for 16 hours, glass rods, 2.5 mm diameter and 6 centimeters long were pulled. The glass transition temperature of this glass was found to be 570° C. by DSC (i.e. Differential Scanning Calorimetry). The glass rods were exposed to ultraviolet radiation at an intensity of 4000 microwatts per $cm^2$ while rotating them along their lengths for 20 minutes at a wavelength of 254 nm. After exposure, the glass rods were heat treated at 580° C. for 30 minutes and then at 670° C. for either 1, 2, 5, 10, 20, 30, 40, or 50 minutes. Following cooling, the depth of crystallization was measured as function of these heat treatment times, and the depth was found to increase with the heat treatment time up to a period of 50 minutes when the glass failed catastrophically. Crystallization depths of 0.08 mm, 0.107 mm, 0.121 mm, and 0.133 mm were achieved for 10, 20, 30, and 40 minute heat treatment periods, respectively. The average strength of the glass rods, which were heat treated at 670° for 40 minutes, was found to be $5.1 \times 10^5$ pascals The average strength of 10 samples of glass not subjected to UV radiation and heat treatment was found to be $1.2 \times 10^5$ pascals. The glass product of this example crystallized only on the surface of the article. After crushing and grinding some of these samples using a mortar and a pestle, the resulting particulate material was subjected to x-ray diffraction which indicated that the surface layer was crystalline.

Example 3

A mixture consisting of 0.025 parts of gold as $HAuCl_4 3H_2O$ and 0.025 parts of cerium dioxide in 100 ml distilled water was stirred until all of the cerium dioxide dispersed completely. 59.8 parts of $SiO_2$, 21.8 parts of $Al_2O_3$ as aluminum hydroxide, 6.4 parts of $Li_2O$ as lithium carbonate, 2.8 parts of $K_2O$ as potassium carbonate, 2.0 parts of $Na_2O$ as sodium carbonate, 1.2 parts of CaO as calcium carbonate, 1.1 parts of MgO as magnesium carbonate, and 4.9 parts of BaO were then added to the water containing gold and cerium dioxide. The mixture was heated at about 100° C., while stirring, so that the slurry dried to a quasi-solid state. The dried slurry was then melted at 1450° C. for 4 hours and was poured on a steel plate. The glass, having a glass transition temperature of 530° C., was then exposed to ultraviolet radiation at an intensity varying from 1200 to 6200 microwatts per square centimeter of surface but at a fixed wavelength of 254 nm. After exposure, the glass was heat treated at 550° C. for 30 minutes and then at 670° C. for 40 minutes. The depth of crystallization was measured and found to increase as a function of the radiation intensity. The depth of crystallization corresponding to an exposure intensity of 4000 microwatts per square centimeter of surface area was 0.7 mm. This depth of crystallization, for a glass containing 0.025 parts of cerium dioxide, is about 6 times more than the 0.133 mm depth of crystallization of glass containing 0.05 parts of cerium dioxide, as in Example 2, at the same intensity and heat treatment times and temperatures. Glass crystallization was observed on only the surface of the 1.5 cm thick sheet. Some samples of the glass were crushed and ground with a mortar and pestle and then subjected to x-ray diffraction which revealed that the crystalline phase was $\beta$-spodumene.

Example 4

A mixture of 0.05 parts of cerium dioxide and 0.05 parts of gold as $HAuCl_4 3H_2O$ in 100 ml of distilled water was stirred until all of the cerium dioxide dispersed completely. 28.7 parts of $SiO_2$, 22.2 parts of $Al_2O_3$ as aluminum hydroxide, 33.3 parts of BaO, 0.98 parts of $Li_2O$ as lithium carbonate, 2.04 parts of $K_2O$ as potassium carbonate, 2.02 parts of $Na_2O$ as sodium carbonate, 1.13 parts of MgO as magnesium carbonate, 1.21 parts of CaO as calcium carbonate, 2.26 parts of SrO as strontium carbonate, and 6.13 parts of $Cs_2O$ as cesium carbonate were then added to water containing gold and cerium dioxide. The mixture was then heated to about 100° C., while stirring, so that the slurry dried to a quasi-solid state. The dried slurry was then melted in a platinum-rhodium crucible at 1450° C. for 4 hours. The melt was poured out as a sheet and exposed to ultraviolet radiation at an intensity of 6200 microwatts/square centimeter and at a wavelength of 254 nm. The glass was then heat treated at 530° C. for 30 minutes and 630° C. for 30 minutes to from a crystalline phase on the surface. When sheets approximating the thickness of this surface layer were poured, exposed, heat treated, and analyzed in substantially the same way as in Example 1, it was found that the crystalline phase was celsian.

Although the invention has been described in detail for the purpose of illustration, it is understood that such detail is solely for that purpose, and variations can be made therein by those skilled in the art without departing from the spirit and scope of the invention which is defined by the following claim.

What is claimed:

1. A process of strengthening a glass article with electromagnetic radiation, said process comprising:
   providing an article formed from an amorphous glass comprising silicon dioxide, aluminum oxide, an alkali metal- or alkaline earth metal-oxide, cerium dioxide, and a nucleating agent in the form of a salt of a metal selected from the group consisting of gold, silver, copper, palladium with gold and/or silver, and mixtures thereof;
   irradiating said article with electromagnetic radiation to oxidize some of the cerium and to generate electrons which reduce some of the metal in the nucleating agent to a metallic state;
   heating the irradiated article to a temperature between about the annealing and softening points of the glass to form a thin crystalline surface layer in the article and a thicker, lower layer containing the amorphous glass adjacent the surface layer; and
   cooling the heated, irradiated article to establish tensile stress and surface compression which strengthens the glass, wherein said irradiating is under conditions suitable to establish the thin crystalline surface layer during said heating.

2. A process according to claim 1, wherein the alkali metal- or alkaline earth metal-oxide is lithium oxide and the thin, crystalline surface layer is substantially pure $\beta$-spodumene.

3. A process according to claim 1, wherein the alkali metal- or alkaline earth metal-oxide is barium oxide and the thin, crystalline surface layer is substantially pure celsian.

4. A process according to claim 1, wherein the alkali metal- or alkaline earth metal-oxide is magnesium oxide and the thin, crystalline surface layer is substantially pure corderite.

5. A process according to claim 1, wherein the electromagnetic radiation is ultraviolet radiation.

6. A process according to claim 5, wherein the ultraviolet radiation has a wavelength of 254 to 365 nm.

7. A process according to claim 5, wherein said irradiating is at an intensity of 1000 to 10000 microwatts per square centimeter of exposed surface of said article.

8. A process according to claim 1, wherein said heating is at a temperature of 10° to 170° C. above the annealing point of the glass, for 10 minutes to 1 hour.

9. A process according to claim 1, wherein said cooling is to a temperature of 25° C. at a rate of −1° to −2° C. per minute.

10. A process according to claim 1, wherein said irradiating and said heating occur consecutively.

11. A process according to claim 1, wherein the ratio of the surface layer bulk cross-sectional area to the lower layer bulk cross-sectional area is up to 0.30:1.0.

12. A process according to claim 1, wherein the amorphous glass comprises 55 to 85 weight % silicon dioxide, 3 to 30 weight % aluminum oxide, 5 to 25 weight % alkali metal- or alkaline earth metal-oxide, 0.03 to 1.0 weight % cerium dioxide, and, in the nucleating agent, up to 0.5 weight % of any gold salt, up to 0.1 weight % of any silver salt, up to 1.0 weight % copper salt, up to 0.02 weight % of any palladium with gold and/or silver.

13. The product of the process of claim 1.

14. The product of the process of claim 2.

15. The product of the process of claim 3.

16. The product of the process of claim 4.

17. A strengthened glass-containing article comprising:
- a thick amorphous lower layer of an alkali metal- or an alkaline earth metal-oxide-aluminosilicate glass composition including cerium dioxide and a nucleating agent in the form of a salt of a metal selected from the group consisting of gold, silver, copper, palladium with gold and/or silver, and mixtures and
- a thinner surface layer adjacent said thick amorphous lower layer and in a substantially crystalline form of the glass composition except, in said surface layer, some of the cerium is in a +4 ionic state and some of the gold, silver, copper, and palladium with gold and/or silver is in a metallic state, wherein the amorphous and surface layers have thicknesses which create large compressive stresses at the surface layer, thereby imparting strength to said article.

18. An article according to claim 17, wherein the alkali metal- or alkaline earth metal-oxide is lithium oxide and the thinner, crystalline surface layer is substantially pure β-spodumene.

19. An article according to claim 17, wherein the alkali metal- or alkaline earth metal-oxide is barium oxide and the thinner, crystalline surface layer is substantially pure celsian.

20. An article according to claim 17, wherein the alkali metal- or alkaline earth metal-oxide is magnesium oxide and the thinner, crystalline surface layer is substantially pure corderite.

21. An article according to claim 17, wherein the ratio of the surface layer bulk cross-sectional area to the lower layer bulk cross-sectional area is up to 0.30:1.0.

22. An article according to claim 17, wherein the amorphous glass in the lower layer comprises 55 to 85 weight % silicon dioxide, 3 to 30 weight % aluminum oxide, 5 to 25 weight % alkali metal- or alkaline earth metal-oxide 0.03 to 1.0 weight % cerium dioxide, and, in the nucleating agent, up to 0.5 weight % of any gold salt, up to 0.1 weight % of any silver salt, up to 1.0 weight % of any copper salt, up 0.02 weight % of any palladium with gold and/or silver.

23. A process of strengthening a glass article with electromagnetic radiation, said process comprising:
- providing an article formed from an amorphous glass comprising 55 to 85 weight % silicon dioxide, 3 to 30 weight % aluminum oxide, 5 to 25 weight % of lithium oxide, barium oxide, or magnesium oxide, 0.03 to 1.0 weight % cerium dioxide, and a nucleating agent in the form of a salt of a metal selected from the group consisting of gold, silver, copper, palladium with gold and/or silver, and mixtures thereof, wherein any gold salt is present in an amount of up to 0.5 weight %, any silver salt is present in an amount of up to 1 weight %, any copper salt is present in an amount of up to 1.0 weight %, any palladium salt with gold and/or silver is present in an amount of up to 0.02 weight %;
- irradiating said article with ultraviolet radiation having an intensity of 1000 to 10000 microwatts per square centimeter of exposed surface of said article to oxidize some of the cerium and to generate electrons which reduce some of the metal in the nucleating agent to metallic state;
- heating the irradiated article to a temperature between about the annealing and softening points of the glass to form a thin crystalline surface layer in the article of substantially pure β-spodumene for lithium oxide-containing glass, celsian for barium oxide-containing glass, or corderite for magnesium oxide-containing glass and a thicker lower layer, containing the amorphous glass, adjacent to the surface layer, wherein the ratio of the surface layer bulk cross-sectional area to the lower layer bulk cross-sectional area is up to 0.30:1.0; and
- cooling the heated, irradiated article to establish tensile stress and surface compression which strengthens the glass.

* * * * *